UNITED STATES PATENT OFFICE.

PETER REDEN AND BERNARD THOLE, OF ST. LOUIS, MISSOURI.

IMPROVEMENT IN PROCESSES AND COMPOUNDS FOR PRESERVING EGGS.

Specification forming part of Letters Patent No. 207,623, dated September 3, 1878; application filed July 17, 1878.

*To all whom it may concern:*

Be it known that we, PETER REDEN and BERNARD THOLE, both of St. Louis, Missouri, have invented a new and useful Method for Preserving Eggs, which is fully set forth in the following specification.

The object of our invention is to prevent the decomposition and consequent rotting and unfitness for use of eggs.

The nature of our invention consists in the application of a chemical compound to the exterior of the shell of the eggs, which said invention consists of the ingredients and the method of preparing and using same, in the manner as will now more fully be described.

We prepare a first solution, consisting of alum and distilled water. To one gallon of the water add one ounce of pulverized alum, which, dissolving in a few minutes, makes this first solution ready for use. The eggs are dipped or immersed in the alum-water. This done, they are next permitted to dry thoroughly. This solution of the alum-water so used enters the pores of the shell of the egg, and thoroughly cleanses and prepares the same the better to receive the coating derived from the use of the following compound, which virtually constitutes the preservative solution or liquid.

We take four pounds of silicated soda, and mix same with a half or gallon of pure distilled water. Secondly, take one and a half ounce of china-clay; add to, and mix with, one pint of distilled water. Thirdly, take one ounce of borax; add and mix it with one pint of distilled water. These three mixtures are separately permitted to dissolve, (requiring about ten minutes' time;) then we pour or mix the entire mixture or result in a two-gallon vessel, and further stir or agitate the mixture, and the same is ready for use.

As soon, therefore, as the previously-dipped eggs (in the solution of alum-water) have thoroughly dried, the same eggs are completely immersed in the last-described mixture. A simple immersion (but so that all the points of the egg shall become moistened) in the solution is sufficient. The eggs are then again permitted to dry, and it will be found that the shells have all their pores sealed air-tight. The eggs thus treated have a coating that, besides having effectually closed all the pores of the shell, leaves the same in its natural color.

The purpose and function of the silicated soda are to fill, close, and crystallize the shell of the egg. To impart body and substance to the ingredient soda aforesaid, the mixture of china-clay is used. It thickens and adds completeness to the coating. The ingredient or mixture of borax possesses the property of forcing or drawing the two before-mentioned ingredients the deeper and more adequately to penetrate into the pores of the egg-shell.

The egg thus prepared will remain wholesome, the organic matter therein remaining in its original state for an indefinite length of time.

We are aware that heretofore a solution of alum-water, or alum-water and salt, has been used, also that silicate of soda or potash has been used, but do not claim the said methods.

What we do claim is—

The method above described for preserving eggs, by dipping the same in alum-water, and, when dry, further immersing the eggs in the chemical compound consisting of silicated soda, china-clay, borax, and water, mixed in the proportions and manner substantially as specified.

In testimony of said invention we have hereunto set our hands.

PETER REDEN.
BERNARD THOLE.

Witnesses:
WILLIAM N. HERTHEL,
JOHN W. HERTHEL.